UNITED STATES PATENT OFFICE.

MAX WEILER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

DYE.

976,417.  Specification of Letters Patent.  Patented Nov. 22, 1910.

No Drawing.  Application filed June 21, 1910. Serial No. 568,102.

*To all whom it may concern:*

Be it known that I, MAX WEILER, doctor of philosophy, chemist, citizen of the German Empire, residing at Elberfeld, Germany, have invented new and useful Improvements in New Dye, of which the following is a specification.

This invention relates to the manufacture and production of new dyestuffs which are obtained by condensing formaurin-di-carboxylic acids with aromatic amins and oxidizing the leuco compounds thus obtained.

The new dyes are dark powders soluble in dilute caustic soda lye generally with a reddish color.

The red to blue dyeings produced with the new dyestuffs can be treated on the fiber with bichromates, fast shades being thus obtained.

In order to illustrate the new process more fully the following example is given, the parts being by weight:—A mixture of 8.2 parts of dimethyl-formaurin-di-carboxylic acid (obtainable from methylene-di-ortho-cresotinic acid), 4 parts of diethylanilin and 100 parts of glacial acetic acid is heated to 100° C. until a sample is no longer colored red by the addition of caustic soda lye. The product of the reaction is poured into ice water and the leuco compound which separates is filtered off. To produce the coloring matter, this leuco compound is dried, then dissolved in strong sulfuric acid and this solution while being stirred is oxidized at 30 to 40° C. with nitrosyl sulfuric acid. When the oxidation is finished the melt is poured on ice and the dye is filtered off. It dyes wool in violet shades which after treatment with bichromates change into a dark violet. The dye can also be dyed on chromed wool or dyed on wool together with the chrome mordant.

Formaurin-di-carboxylic acid gives analogous results.

Other amins can be used, e. g. dimethyl-anilin, ethyl-benzyl-anilin, or their derivatives e. g. chloro-methyl-sulfo- or carboxy derivatives, meta-ethyl-oxyphenyl-para-tolylamin, para-tolyl-alpha-naphthylamin, para-xylidin, etc.

The condensation can also be carried out in another manner e. g. in a solution of sodium acetate.

The oxidation can be carried out with other oxidizing agents e. g. with nitric acid, fuming sulfuric acid, nitro compounds, etc.

I claim:—

The herein described dyestuffs obtainable from formaurin-di-carboxylic acids and aromatic amins, which dyestuffs are dark powders soluble in dilute caustic soda lye generally with a reddish color, dyeing wool from acid baths generally from red to blue shades which can be chromed after dyeing, substantially as described.

In testimony whereof I have hereunto set my hand in the presence of two subscribing witnesses.

MAX WEILER. [L. S.]

Witnesses:
 OTTO KÖNIG,
 CHAS. J. WRIGHT.